No. 622,107. Patented Mar. 28, 1899.
R. C. BERRY.
PRINTING, STAMPING, OR CANCELING MACHINE.
(Application filed Mar. 30, 1898.)
(No Model.) 7 Sheets—Sheet 1.
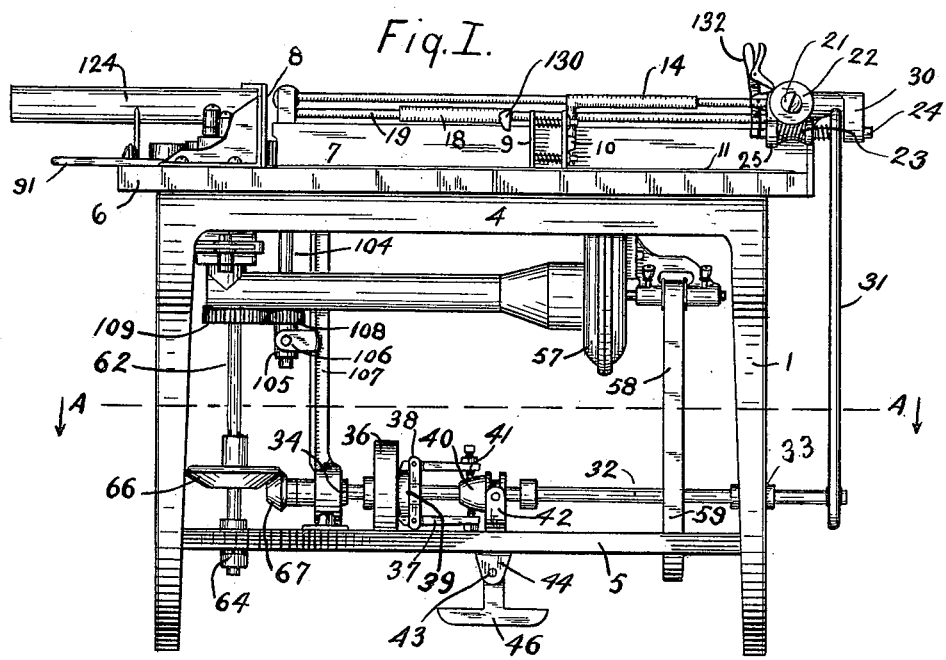
Fig. I.
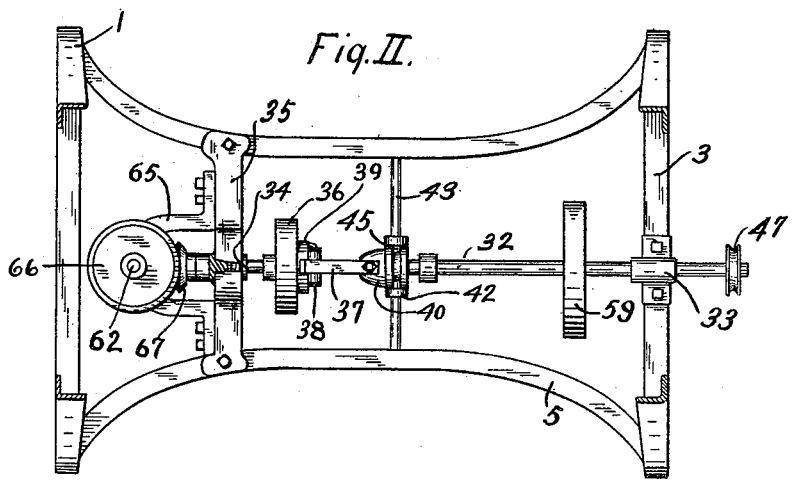
Fig. II.
Witnesses
R. D. Hawkins.
Kate Dunlap.
Inventor
Robert C. Berry
By V. H. Lockwood
His Attorney.

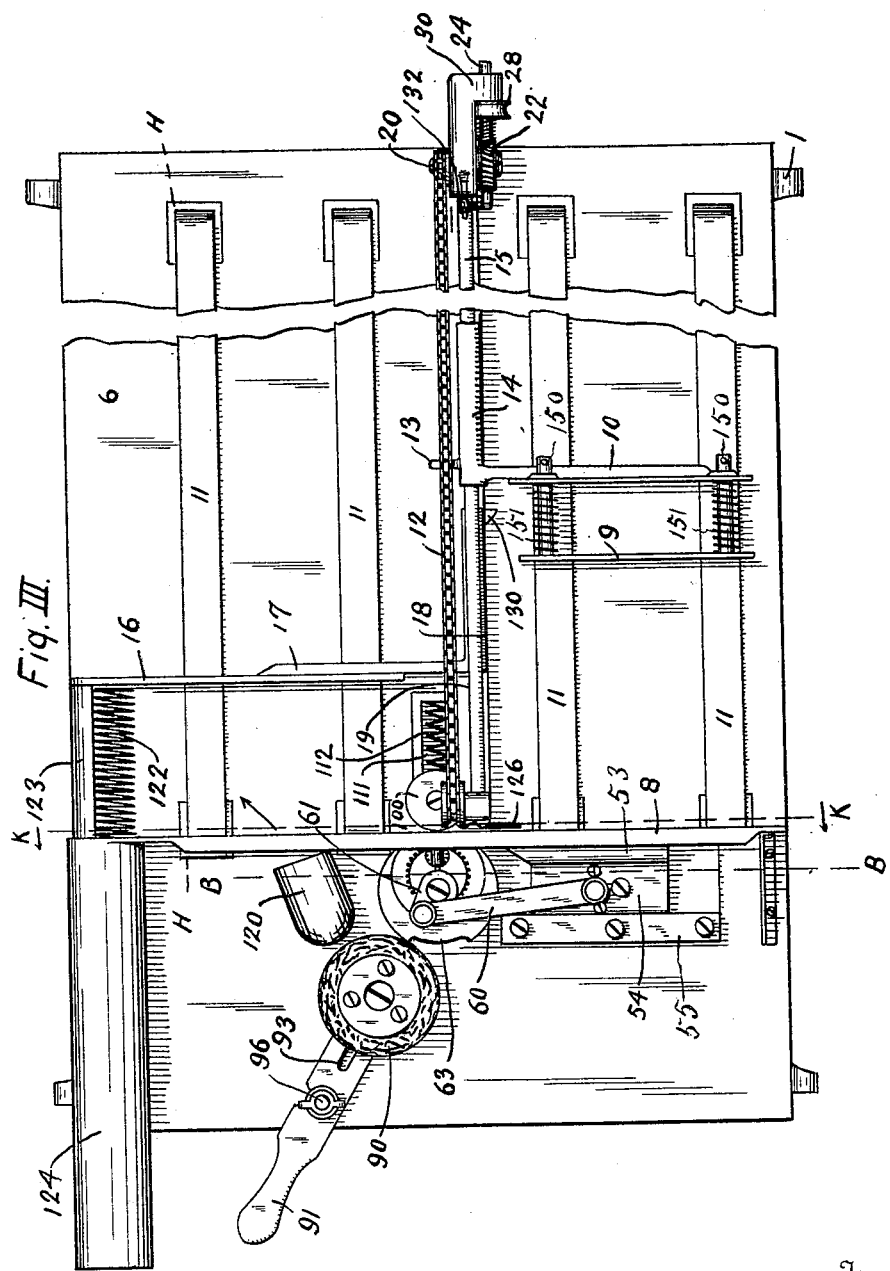

No. 622,107. Patented Mar. 28, 1899.
R. C. BERRY.
PRINTING, STAMPING, OR CANCELING MACHINE.
(Application filed Mar. 30, 1898.)
(No Model.) 7 Sheets—Sheet 3.
Fig. IV.
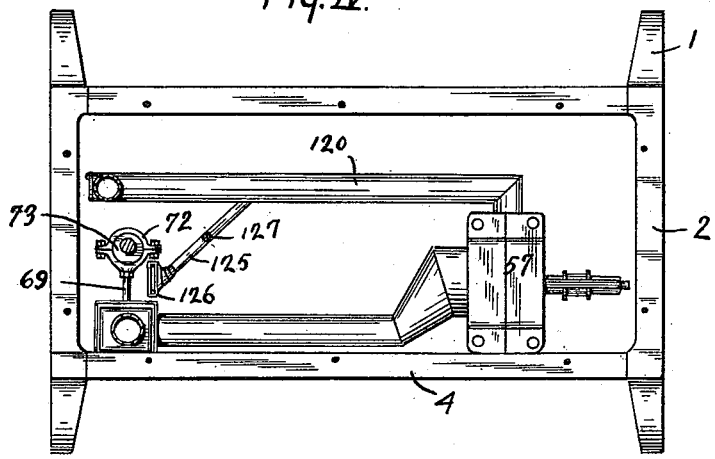
Fig. V.
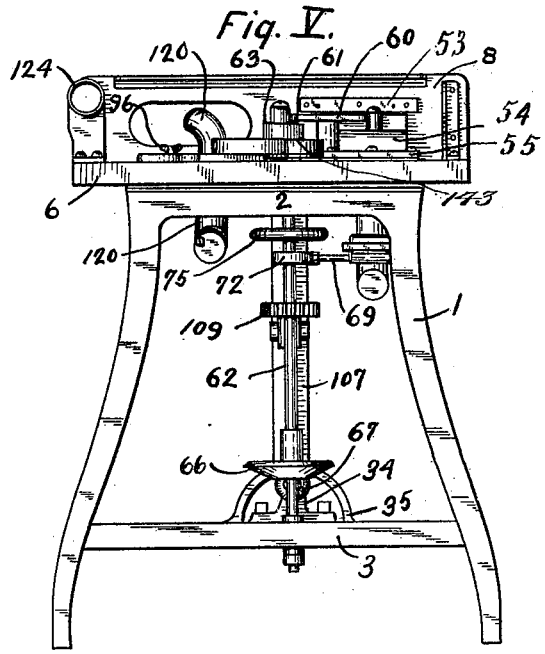
Witnesses
R. D. Hawkins
Kate Dunlap
Inventor
Robert C. Berry
By V. H. Lockwood
His Attorney.

No. 622,107. Patented Mar. 28, 1899.
R. C. BERRY.
PRINTING, STAMPING, OR CANCELING MACHINE.
(Application filed Mar. 30, 1898.)
(No Model.) 7 Sheets—Sheet 4.
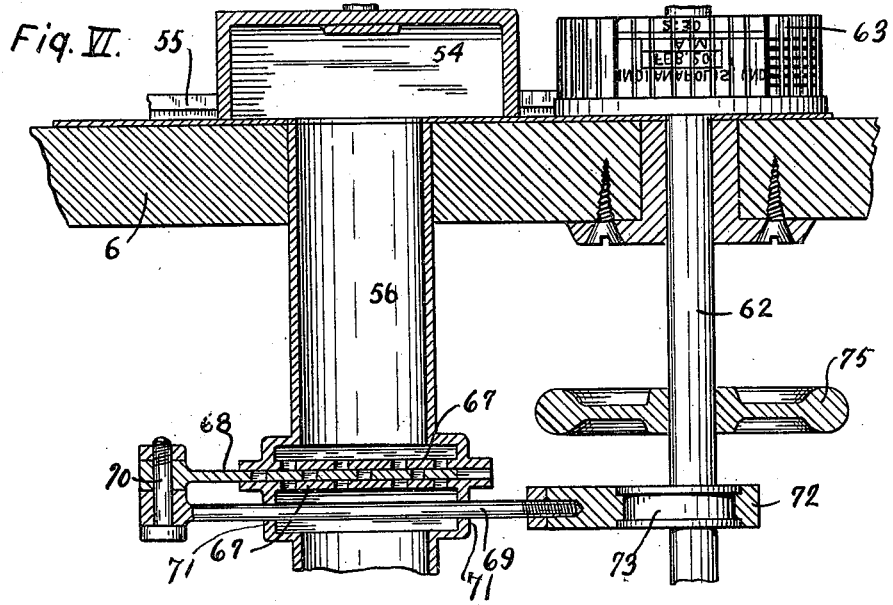
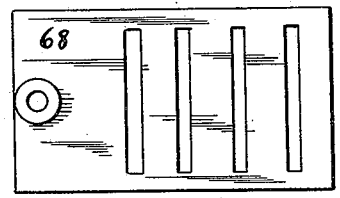
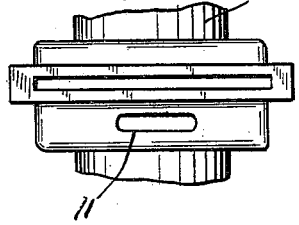
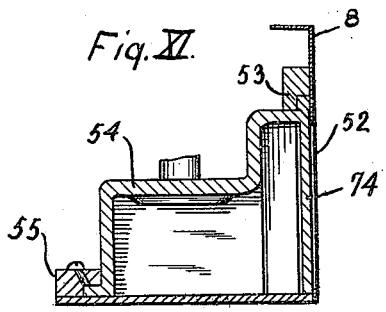
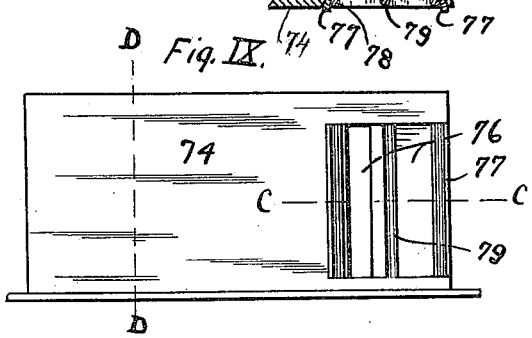
Witnesses
R O Hawkins
Kate Dunlap.
Inventor
Robert C Berry
By V H Lockwood
His Attorney.
THE NORRIS PETERS CO., PHOTO-LITHO., WASHINGTON, D. C.

No. 622,107. Patented Mar. 28, 1899.
R. C. BERRY.
PRINTING, STAMPING, OR CANCELING MACHINE.
(Application filed Mar. 30, 1898.)
(No Model.) 7 Sheets—Sheet 5.
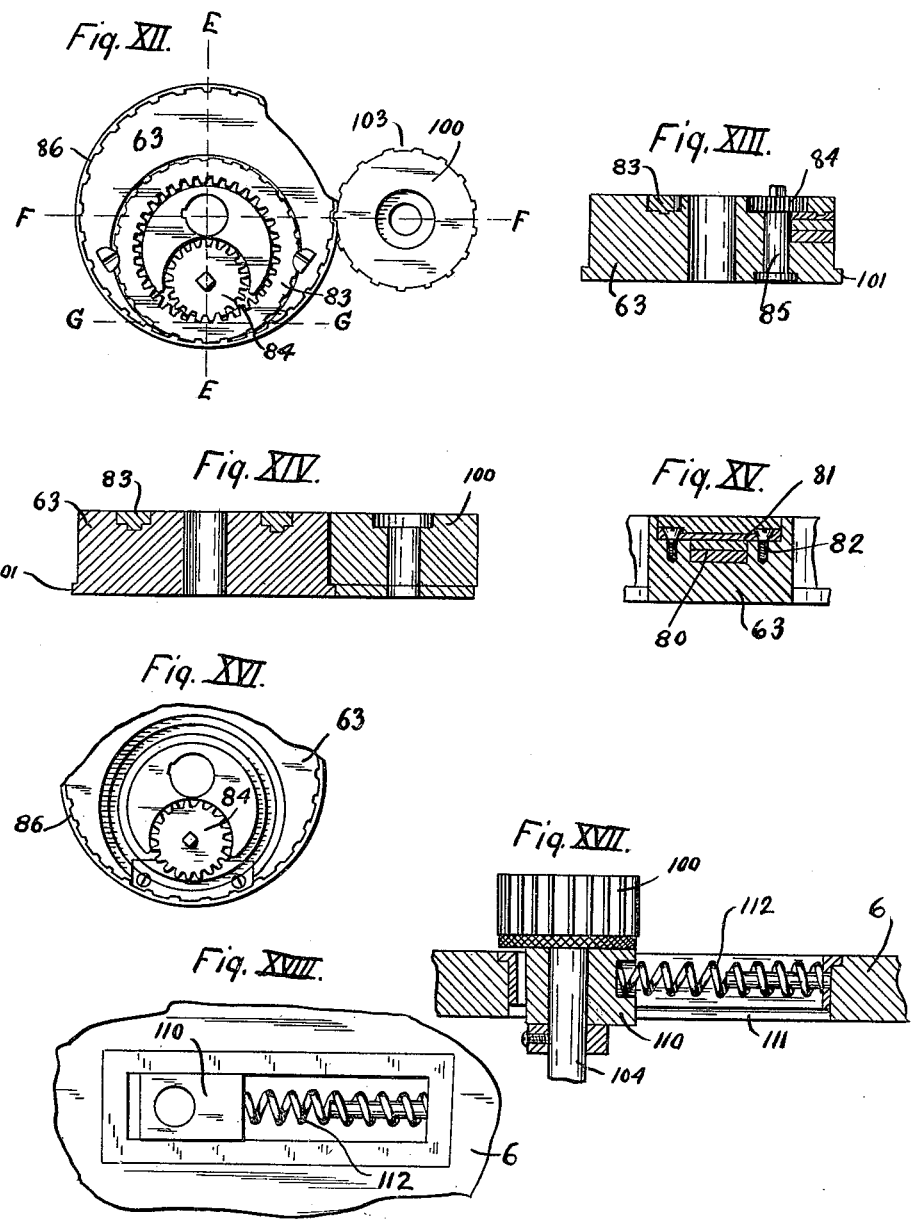
Witnesses
R D Hawkins
Kate Dunlap
Inventor
Robert C. Berry
By V. H. Lockwood
His Attorney.

No. 622,107. Patented Mar. 28, 1899.
R. C. BERRY.
PRINTING, STAMPING, OR CANCELING MACHINE.
(Application filed Mar. 30, 1898.)
(No Model.) 7 Sheets—Sheet 6.
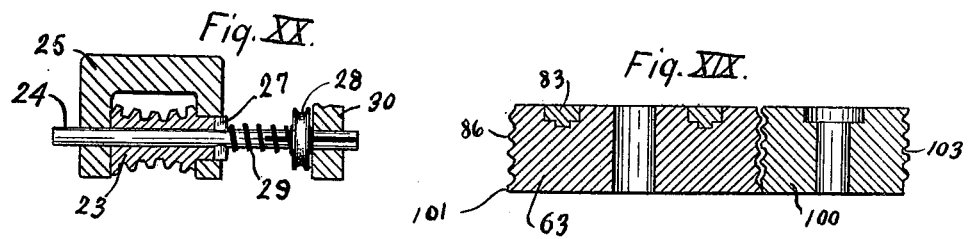
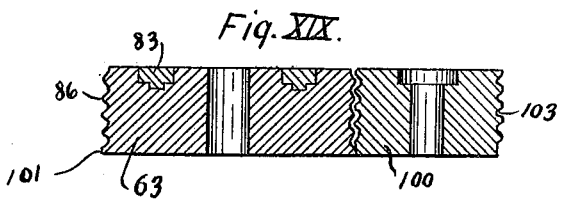
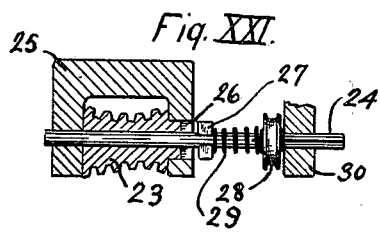
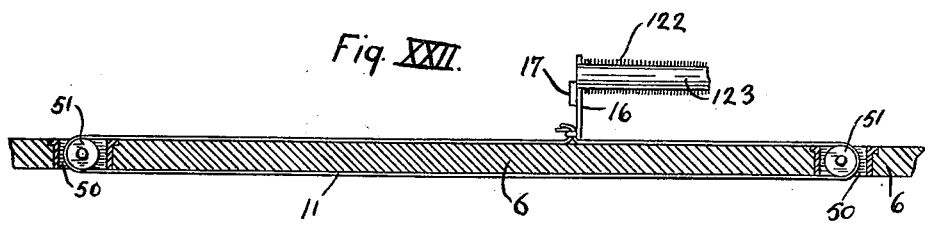
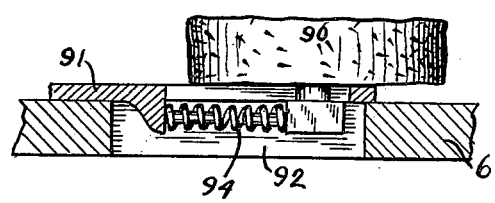
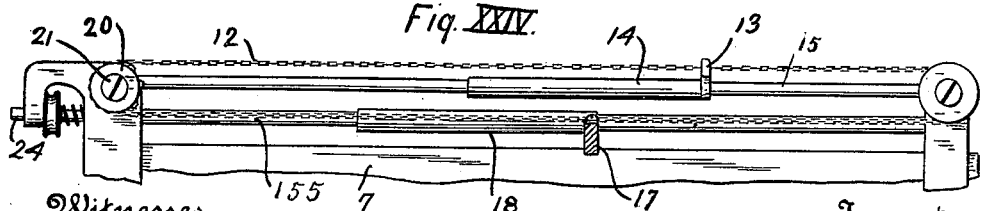
Witnesses
R. D. Hawkins
Kate Dunlap.
Inventor
Robert C. Berry
By V. H. Lockwood
His Attorney.
THE NORRIS PETERS CO., PHOTO-LITHO., WASHINGTON, D. C.

No. 622,107. Patented Mar. 28, 1899.
R. C. BERRY.
PRINTING, STAMPING, OR CANCELING MACHINE.
(Application filed Mar. 30, 1898.)
(No Model.) 7 Sheets—Sheet 7.
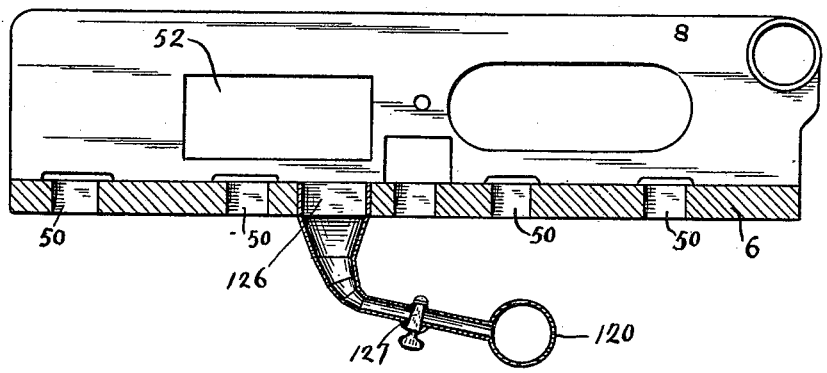
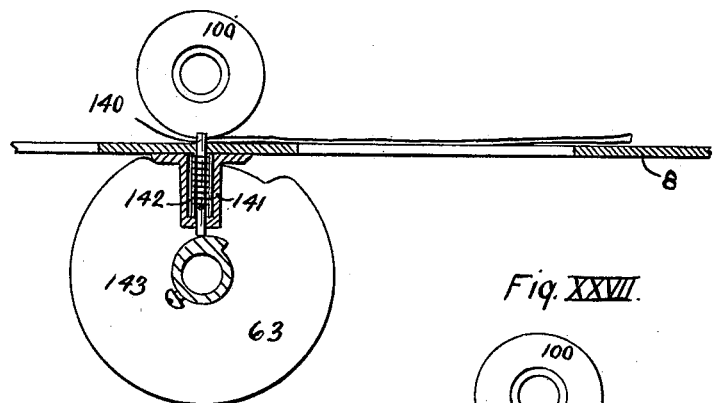
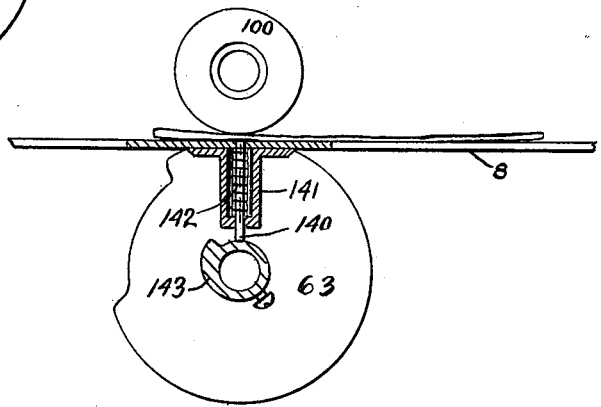
Witnesses
R D Hawkins
Kate Dunlap
Inventor
Robert C Berry
By V. H. Lockwood
His Attorney.
THE NORRIS PETERS CO., PHOTO-LITHO., WASHINGTON, D. C.

UNITED STATES PATENT OFFICE.

ROBERT C. BERRY, OF INDIANAPOLIS, INDIANA, ASSIGNOR, BY DIRECT AND MESNE ASSIGNMENTS, TO THE PNEUMATIC CANCELLING MACHINE COMPANY, OF SAME PLACE.

PRINTING, STAMPING, OR CANCELING MACHINE.

SPECIFICATION forming part of Letters Patent No. 622,107, dated March 28, 1899.

Application filed March 30, 1898. Serial No. 675,819. (No model.)

*To all whom it may concern:*

Be it known that I, ROBERT C. BERRY, of Indianapolis, county of Marion, and State of Indiana, have invented a certain new and useful Printing, Stamping, or Canceling Machine; and I do hereby declare that the following is a full, clear, and exact description thereof, reference being had to the accompanying drawings, in which like figures refer to like parts.

This invention relates to certain improvements in printing, stamping, and canceling machines of the pneumatic-feed type, such as is to be found in a prior application by me, filed December 13, 1897, Serial No. 661,631.

The invention set forth in my prior application related, chiefly, to the use of a pneumatic feed in machines of this character. Such pneumatic feed is employed in my present invention; but the means for utilizing the same are novel in several respects, as will hereinafter appear.

The leading feature of this present invention consists in the employment of the reciprocating carriage or box through which the pneumatic draft acts to cause the letter or other article to be held tightly against the carriage or box while the carriage or box is conveying the letter to the canceling, printing, or stamping rolls.

Another important feature of this present invention consists, broadly speaking, of the employment of means for holding the letters or other articles after they have been canceled, printed, or stamped and blown into a pack by the pneumatic stacking-tube in an upright position. This means consists of pins, projections, or wires so located with reference to the stacking-blast that the letters will extend between the projections or pins. These pins or projections are in a series, comb-like.

Another feature of this invention consists in the employment of a stop for holding the letter or other article in a certain position until the canceling or printing portion of the printing-roll is ready to act upon the letter or article. Then the stop is removed, ceases to act as such, and permits the letter or other article to pass on and be printed.

The object of this invention is to cause the canceling-marks or printing to be placed upon a certain part of the letter or article, which is necessary because of their varying lengths and the difference in slippage between light and heavy letters and other articles while being conveyed by the pneumatic feeding device.

Another feature of this invention consists in the manner set forth of constructing the surface of the type-wheel and feed-roll with alternating ribs thereon, so that they will accomplish their work efficiently, and yet no ink will be transferred from the type-wheel. With such arrangement the feed-roll will not become inked, and therefore will not mark or mar the back or other side of the letter or article. Furthermore, by reason of this feature of the invention the feed-roll will not come in such contact with the type or marking portion of the type-wheel as to destroy or injure the same.

Another feature of the invention consists in the means for feeding the body of letters up to the pneumatic feeding device, as well as feeding the body of letters away from the printing device.

These, together with the other features of my invention, will more fully appear from the accompanying drawings and the description and claims following.

In the drawings, Figure I is a front elevation of my canceling or printing machine. Fig. II is a section on the line A A of Fig. I. Fig. III is a plan view of the machine. Fig. IV is a detail showing the pneumatic tubes in plan and their relation to the frame, the top of the machine being removed. Fig. V is an elevation of the left-hand portion of the machine as shown in Fig. I, various parts, however, being omitted. Fig. VI is a vertical cross-section on the line B B of Fig. III. Fig. VII is a plan of the valve for the pneumatic tube. Fig. VIII is an elevation of the part of the pneumatic tube in which the valve operates. Fig. IX is an elevation of the reciprocating carrier. Fig. X is a section on the line C C, Fig. IX. Fig. XI is a section on the line D D, Fig. IX. Fig. XII is a plan of the type-wheel and feed-roll. Fig. XIII is a section of the type-wheel on the line E E of Fig. XII. Fig. XIV is a section on the line F F of Fig. XII. Fig. XV is a section on the line G G of Fig. XII. Fig. XVI is a plan of a portion of the type-wheel with the hour type-wheel removed. Fig. XVII is a longitudinal vertical section through a portion of the machine near the feed-roll. Fig. XVIII is a plan view of the same with the feed-roll removed. Fig. XIX is a section of the type-wheel and feed-roll on the line F F of Fig. XII, the ribs and corrugations, however, being annular. Fig. XX is a longitudinal vertical section of the means for driving the block that feeds the body of letters up to the pneumatic feeding device in gear. Fig. XXI is the same out of gear. Fig. XXII is a vertical longitudinal section on the line H H of Fig. III. Fig. XXIII is a vertical section of a part of the device, showing the ink-pad and the manner of mounting the same. Fig XXIV is a rear elevation of the portion of the board longitudinally dividing the table-top. Fig. XXV is a vertical section on the line K K, Fig. III. Fig. XXVI is a detail of the letter-stopping mechanism, showing parts in horizontal section and parts in plan before the letter is taken up by the feed-roll. Fig. XXVII is the same after the letter has been taken up by the feed-roll.

In detail a framework is provided comprising four legs 1 with suitable cross-pieces 2 at the top and 3 near the lower end and suitable longitudinal side bars 4 at the top.

5 are longitudinal curved brace-bars connecting the ends, as seen in Fig. II. Upon this frame I mount a bed or top 6. On the top there is a longitudinal partition 7, extending from the left-hand end of the machine to the cross-partition 8, which is a very thin strip of metal and constitutes the guide-board or feed-board, along the side of which the letters or other articles are conveyed.

The collection of letters is conveyed from the right-hand end to the left along the front half of the top by feed-blocks 9, carried and propelled by the arm 10, and also by the belts 11, with a pair of each running over the top, as shown in Fig. III. The block 9 has a spring-pressed face secured to the rods 150, that are slidably mounted in the arm 10 and have coiled about them the spiral spring 151, as shown in Fig. III. The arm 10, that propels the block 9, is moved along by the chain 12, that engages the finger 13 on the sleeve 14, which rides on the guide-rod 15. Another feeding-block 16 is provided on the other side of the table, which moves to the right as the letters which have been canceled or stamped are pressed or packed against it. It is moved along also by the arm 17, that extends from the sleeve 18, which rides on the guide-rod 155. This sleeve 18 is also connected with the lower part of the chain 12 by a screw that secures a link to the arm 17, as shown in Fig. XXIV, so that the same chain operates both feeding-blocks in opposite directions.

The chain is actuated by sprocket-wheels 19 and 20. This is more clearly shown in Fig. XXIV. The sprocket-wheel 20 is mounted on the shaft 21, which carries the worm-gear 22, and it engages the worm 23, mounted on the spindle 24. (All to be seen in Fig. I.) As seen in Fig. XXII, the spindle 24 is mounted in the frame 25. The worm 23 has a hub at one end that works in a suitable bearing in the frame 25 and has a recess or slot in its end at 26 to receive the pin 27. When the pin fits in such seat, the slot 26 and the rotation of the spindle 24 drives the worm; but when the spindle is pushed outward, as seen in Fig. XXI, so that the pin 27 does not engage the worm, the worm will not operate, and therefore the feeding device heretofore described will be inoperative. As seen in Figs. I and III, the spindle 24 extends inward somewhat farther than the frame 25, and therefore when the feeding-block 16 has reached its limit of movement rearward the lug 130 on the sleeve will engage the spindle 24 and by pushing it outward throw the mechanism above described out of gear. For the purpose of accomplishing this by hand I provide a little hand-lever 132, as seen in Fig. I. The spindle 24 is driven by the pulley 28 and is pressed into operative engagement with the worm by the spiral spring 29. The outer end of the spindle has its bearing in an arm 30.

The mechanism heretofore described for feeding up the body of letters is driven by the belt 31 (to be seen in Fig. I) from the main driving-shaft 32. That shaft is mounted in a bearing 33, (to be seen in Fig. II,) secured on the cross-piece 3, and also in the bearing 34 on the cross-piece 35. A loose driving-pulley 36 (to be seen in Fig. I) is mounted on the shaft 32 and is driven from any suitable force or power. It is thrown into and out of gear with shaft 32 by a clutch. I show a friction-clutch consisting of the levers 37, pivoted in the brackets 38, so mounted on the disk 39, secured to the shaft 32, adjacent to the hub of the driving-pulley, that when the outer ends of the levers 37 are spread the inner ends of said levers will clamp and clutch the hub of the driving-pulley and cause the two to rotate together. The outer ends of the levers 37 are spread by a sliding cone 40, that engages the points 41 in the outer ends of the levers 37. The cone 40 is caused to slide on the shaft 32 by the yoke 42, secured on the oscillating shaft 43, carried in the brackets 44. The brackets 42 are provided with pins 45, which enter a groove in the cone 40. The shaft 43 is oscillated by a depending pedal 46, that is secured thereto. By placing the foot on one side or the other of such pedal the cone-shaft 43 will be oscillated one way or the other. There is nothing new, so far as I am concerned, in the clutch mechanism which has been described or the means for operating the clutch. Any other kind of a clutch mechanism can be used as desired.

The shaft 32 on its outer end carries a pulley 47, on which the belt 31 can operate.

In addition to the sliding blocks 9 and 16 which I have heretofore devised I add the belts 11, upon which the letters rest edgewise and by which they will feed singly to the pneumatic feeding device. The practical effect of said belts added to such sliding block is to keep the individual letters in the whole body of letters being moved on the table distributed and so they will not pack too closely together or with irregularity as the sliding block moves along farther and farther. It is clear that without the belt as the block moves up the letters nearer the block would be gradually packed together very tightly, while the letters farther removed would not so much as feel the pressure of the block, and therefore the letters would be unevenly distributed. The bad effect of this is that when the last batch of letters, which are tightly compressed by the sliding block, reaches the pneumatic feed device they will be pressed so tightly against such pneumatic feed and the friction between the letters will be so great that two or more letters will be conveyed by the pneumatic feed instead of one.

The mounting of the belts is shown in Fig. XXII. The table is provided with suitable slots 50, in which are mounted pulleys 51, over which the belts run. The belt shown in Fig. XXII is the rearmost belt shown in Fig. III. It is used in connection with the mechanism for stacking the letters after they have been canceled, although the mounting of all is similar. The belts are propelled by their connection with the sliding blocks 9 and 16, respectively.

The letters which are fed up to the pneumatic feed, as heretofore described, are singly fed on edge and endwise on the table from the front to the rear between the type-wheel and feed-roll and against the partition 8. The partition 8 is provided with two large slots, as seen in Fig XXV. Along the upper edge of the slot 52 a guide 53 is provided, and near the lower edge of the slot a parallel guide-piece 55 is secured to the top of the table to guide the reciprocal movements of a carrier or box 54, that has a vertical suction-face 74 toward the body of the letters being fed up to it and has flanges that enter the guides. The letter is caused to adhere to the face of this sliding carrier or box by suction through the opening 76 in its face and the pneumatic tube 56, that leads to said carrier or box from a suitable exhaust-fan 57. The exhaust-fan is driven by the belt 58 and the pulley 59 from the driving-shaft 32. Reverting to Fig. VI a section of some of the parts just referred to will appear.

The carrier or box 55 is reciprocated by the link 60 and crank 61, which is secured to the upper end of the vertical shaft 62. The type-wheel 63 is also mounted on the upper end of said shaft 62, as seen in Fig. VI. The shaft 62, as shown in Fig. I, is mounted in a bearing 64 on the bracket 65. (To be seen in Fig. II.) It is driven by the gear 66 and 67.

Every time the carrier or box 55 is moved toward the type-wheel 63 it conveys one letter to the type-wheel. In order to make the operation of the two uniform and also to shut off and turn on the exhaust or suction 56 through the box 54 at the right time, I provide the mechanism shown in Fig. VI. A valve mechanism is provided in the exhaust-tube, comprising two gridiron plates or seats 67, between which the gridiron-valve 68 is reciprocated by the rod 69. This rod is pivoted by the pin 70 to the gridiron-valve and extends through the slots 71 in the walls of the exhaust-tube and is secured to a yoke or strap 72, which operates on an eccentric 73, which is secured to the shaft 62. This provides a positive valve mechanism for the exhaust-tube that shuts off or opens up the tube at exactly the right time to accommodate the type-wheel. A hand-wheel 75 (to be seen in Fig. VI) is also secured to the shaft 62 for rotating the type-wheel when it is being fixed or changed.

The working face 74 of the sliding carrier or box 54 is shown in Figs. IX, X, and XI. The exhaust-opening 76 is to be seen in Fig. IX. A strip of rubber 77 is secured at each side of said opening by the clamping-bars 78, as seen in Fig. X.

79 is a center bar or piece to prevent letters being drawn into the carrier-box by the exhaust.

The type-wheel is constructed as follows: This wheel is recessed on its upper side to receive certain plates or rings bearing the type necessary for printing whatever may be desired on the letter or similar article, as seen in Figs. XIII and XV. Plates 80 are held in their seat by the plate 81, through which pass suitable screws 82. These plates extend to the periphery of the type-wheel and have on them the name of the city and State, or month and year, or anything else desired. There is no invention in this. The novel feature, however, consists in the ring 83, on whose periphery there is type for the various hours in the day. This ring has internal teeth that mesh with a toothed wheel 84, mounted upon a square-ended pin or pivot 85. The ring 83 operates in a suitable annular groove in the type-wheel, as is seen in Figs. XII, XIV, XVI, and XIX. By applying a key to the pin 84 the ring 83 can be turned from one hour to another. The canceling is done by the ribs 86. In Fig. XII these ribs are vertical; but the preferable form is shown in Fig. XIX, where they are annular. The type-wheel is inked by the following mechanism: An inking-wheel 90 is rotatably mounted on a handle 91. The handle fits in a slot 92 in the table. A slot 93 (to be seen in Figs. III and XXIII) permits the sliding movement of the inking-wheel, which is held outward by a spring 94. The handle 91 is secured to the table by a button 96, that screws down on a suitable shank that extends through the notch on one side of the handle. By somewhat releasing the button the handle may be removed sidewise. The only novelty in this part of the machine lies in the handle as a means for mounting and readily removing and replacing the ink-wheel.

To prevent the letter or other article from passing between the feed-roll and type-wheel until the stamped part of the type-wheel is moved into proper position for stamping the letter, I provide the means shown in Fig. XXVI, which consists of a plunger-rod 140, mounted in a barrel or casing 141 on the type-wheel and held inward by the spiral spring 142. It is propelled outward into the path of the letters by the cam 143, that is secured on the vertical shaft that carries the type-wheel. The said cam is secured by a screw, so that its position can be properly adjusted to cause this plunger to operate at the right time. Immediately in advance of the type on the type-wheel said wheel is recessed or cut away, as is shown in Fig. XXVI, to prevent such surface from engaging and therefore disfiguring the letter and also to prevent it from feeding the letter, so that the type will contact with the letter at the right place.

The feed-roll 100, as can be seen in Figs. III, XII, XIV, XVII, and XIX, coöperates with the type-wheel. The letters pass between them, and the feed-roll keeps the letters pressed against the type-wheel, and the two wheels together feed through between them. For this latter purpose an annular extension 101 is provided along the lower edge of the type-wheel. This extension engages the flush surface of the feed-roll, so that the portion of the type-wheel above such annular extension 101 is removed sufficiently far from the feed-roll that the latter will not touch such upper portion of the type-wheel or any of the type. In this way no ink will be transferred to the periphery of the feed-roll, and it will not injure the type on the type-wheel. Since thus the feed-roll is free from ink, it will not mark or mar the back of the letter.

The periphery of the feed-roll is provided with depressions 103, that correspond with the ribs on the type-wheel. These may be vertical, as in Fig. XII, or, preferably, annular, as in Fig. XIX. Such depressions will have ribs between them on the feed-roll, which snugly engages the letter and presses it against the type-wheel, so that the type will make a distinct impression on the letter. This feed-roll 100 is mounted on the upper end of the shaft 104, which extends through the table and is mounted at its lower end in a bearing 105, that is carried in the bracket 106 on a piece 107. (To be seen in Fig. I.) It is driven by a gear 108, meshing with the gear 109 on the shaft 62. Since the type-wheel is mounted on the shaft 62, it is seen that the type-wheel and feed-roll are driven in unison and are explained in my prior application.

The manner of mounting the bearing 105 comprises an oscillation of the upper bearing 110. (To be seen in Figs. XVII and XVIII.) Said bearing 110 is slidable in the slot 111 and is pushed toward the type-wheel by the spring 112, all much the same as in my prior application.

After the letter has passed between the feed-roll and type-wheel and is canceled or printed it is blown diagonally in the direction indicated by the arrow against the sliding block 16 by a blast through the tube 120. This tube extends from the blast end of the fan. The upper end of the blast-tube 120 is preferably so mounted on the body of the table that it can be turned somewhat; but the friction of the joint will hold it in place after it has been turned. This permits one to adjust the direction of the blast to suit the work from time to time. As stated, the blast places the letter diagonally against the block 16, causing it when it strikes the blast to slide longitudinally in between the comb-like series of teeth 122. This holds the letter upright in place. In this operation it is well to note that the letter is thrown from the feed-roll and type-wheel with considerable impetus as it leaves them. The preferable method of arranging these teeth is to use a spiral spring, so that the curved springs will serve as teeth to hold the letters upright. As shown, the spring 122 is secured to a back 123, that is secured at one end to the sliding back, and such back and spring slide out of a barrel 124 as the letters are being stacked. In order to prevent the letters as they approach the pneumatic feeding device from adhering together by reason of friction, so that more than one would be transferred at a time, I provide a branch tube 125 from the blast-tube 120, that has a rectangular outlet 126 about one-fourth inch wide and two or three inches long under the letters as they approach the pneumatic feed. I provide a valve 127 in such pipe to adjust the force of the blast.

What I claim as my invention, and desire to secure by Letters Patent, is—

1. A printing, stamping or canceling machine including a table a feed-board across the table provided with a suitable slot, a reciprocating pneumatic carrier-box with a suction-face registering with such slot and means for feeding the letters, &c., in a pack with their edges resting on the table to the suction-face of the carrier.

2. A printing, stamping or canceling machine including a table with an opening in it, a tube leading from an air-exhaust mechanism to such opening, and a reciprocating box mounted on the table over such opening and having a suction-face for engaging letters, &c., as they are fed up to it.

3. A printing, stamping or canceling machine including a table, a feed-board across the table provided with a suitable slot in it, a reciprocating carrier-box with an open bottom and suction-face that registers with the slot in the feeding-board, suitable guide-strips on the feed-board and table to guide the movement of the box, and an exhaust-tube leading from the box through the table.

4. A printing, stamping or canceling machine including a printing-wheel, a shaft on which it is mounted and by which it is operated, a pneumatic feeding device for feeding the letters, &c., to the printing-wheel, a valve for regulating the passage of air through the pneumatic device, and means connected with the shaft carrying the printing-wheel for operating said valve.

5. A printing, stamping, or canceling machine including a printing-wheel, a shaft upon which the same is mounted and by which it is rotated, a reciprocating carrier-box with a suction-face for feeding the letters to the printing-wheel an exhaust-tube leading from such box, a gridiron-valve in said tube, an eccentric on the shaft for actuating the type-wheel and means for connecting said eccentric and said valve.

6. A printing, stamping, or canceling machine including a table, a type-wheel mounted thereon, a frame or handle mounted in a slot in the table, means for detachably securing the frame or handle to the table, and an inking-wheel spring-mounted in a slot in the frame or handle, substantially as shown and described.

7. A printing, stamping or canceling machine including a sliding block against which the letters or other articles may be stacked after they are printed or canceled, projections or teeth secured to a bar that is connected with said block, and a blast-tube for blowing the letters as they come from the printing device so their ends will enter between said projections or teeth.

8. A pneumatic printing, stamping or canceling machine including a sliding block, a bar extending at right angles from one end of said block, a spiral wire secured to said bar with its coils extending parallel to the sliding block, and a blast-tube so located as to blow the letters as they come from the printing device that their ends will enter the spaces between the coils of wire.

9. A printing, stamping or canceling machine including a table, means against which the letters, &c., can be stacked, and a blast-tube for stacking the letters so formed that the direction of the blast can be adjusted.

10. A printing, stamping or canceling machine including a table, a feed-board with a slot in it, a sliding block parallel with said feed-board and opposite said slot, a bar extending at right angles from the end of said block, and a blast-tube opposite the slot in said feed-board and so constructed that the direction of the blast can be adjusted.

11. A printing, stamping or canceling machine including a device for transferring the letters, &c., to the printing mechanism singly as they are fed up to it in a pack on their edge, and means for directing a blast of air against the edges of the letters as they approach the device for transferring them.

12. A printing, stamping or canceling machine including a table a feed-board thereon, a block for feeding the body of letters forward against the feed-board, a printing device, means for conveying the letters along said feed-board to the printing device, and a tube for furnishing a blast of air against the letters that are near the feed-board.

13. A printing, stamping or canceling machine including a type-wheel, a barrel or casing mounted at the point where the type-wheel contacts with the letters, &c., a spring-withheld plunger-stop mounted therein and a cam that rotates with the type-wheel and forces said plunger into the path of the letters, &c., and holds the same in such position until the stamp portion of the type-wheel is ready to operate on the letter.

14. A printing stamping, or canceling machine including a type-wheel and a feed-roll with their engaging peripheries provided with ribs, the ribs on the type-wheel alternating with those on the feed-roll, and means for inking the ribs on the type-wheel.

In witness whereof I have hereunto set my hand this 2d day of March, 1898.

ROBERT C. BERRY.

Witnesses:
V. H. LOCKWOOD,
JOHN FEIGEN.